United States Patent [19]

Payne et al.

[11] Patent Number: 5,544,672

[45] Date of Patent: Aug. 13, 1996

[54] SLUG FLOW MITIGATION CONTROL SYSTEM AND METHOD

[75] Inventors: Richard L. Payne, McKinney, Tex.; Richard E. Huff; Wayne E. Ogren, both of Anchorage, Ak.

[73] Assignee: Atlantic Richfield Company, Los Angeles, Calif.

[21] Appl. No.: 139,391

[22] Filed: Oct. 20, 1993

[51] Int. Cl.⁶ ..................................................... B01D 19/00
[52] U.S. Cl. ................. 137/1; 137/171; 137/187
[58] Field of Search .................. 137/17, 1, 178, 137/179, 182, 187, 177

[56] References Cited

U.S. PATENT DOCUMENTS

| | | | |
|---|---|---|---|
| 3,416,547 | 12/1968 | Glenn, Jr. et al. | 137/171 |
| 4,715,398 | 12/1987 | Shouldice et al. | 137/171 |
| 5,256,171 | 10/1993 | Payne | 95/19 |

*Primary Examiner*—Kevin Lee
*Attorney, Agent, or Firm*—Michael E. Martin

[57] ABSTRACT

Liquid slug flow in oil production well flowlines and the like is controlled by a throttling valve in the flowline upstream of a gas-liquid separator and a differential pressure gauge, densitometer or other device for measuring the presence and the volume of the slug in the flowline. The throttling valve may be actuated to throttle fluid flow into the separator in relation to the presence of the slug and the duration of the slug as determined by the slug detection device. Slug mitigation may also be controlled by throttling flow into the separator in relation to the level of liquid in the separator between a threshold level and a maximum liquid level. A third method for mitigating slug flow measures the available volume in the separator vessel and the volume of the liquid slug moving toward the separator vessel to effect proportional throttling of fluid flow. A liquid slug may be detected by a differential pressure gauge or a densitometer interposed in the flowline upstream of the throttling valve.

9 Claims, 1 Drawing Sheet

SLUG FLOW MITIGATION CONTROL SYSTEM AND METHOD

BACKGROUND OF THE INVENTION

1. Field of the Invention

The present invention pertains to a system and method for controlling liquid slug flow in multi-phase fluid pipelines, particularly in oil and gas production facilities.

2. Background

In the production of oil and gas from subterranean wells, a long-standing problem is that of dealing with the two-phase flow (gas and liquid) of the produced fluid which may vary considerably during the production life of a well or a group of wells whose flow is commingled in a common production flowline. Late in the life of an oil-bearing formation, for example, there may be substantial production of gas along with the production of hydrocarbon liquids, particularly if gas is being used as a drive fluid to force crude oil to the production well or wells. This two-phase flow often results in so-called slug flow wherein "slugs" of liquid occur in the flowlines which are connected to the separation, treatment and pumping equipment. Accordingly, this equipment must be sized initially to accommodate the slugs or the fluid handling facilities must be modified at some point during the life of a production field to accommodate the increased slug flow. Since the conventional approach to managing slug flow is based primarily on the prediction of maximum slug flow conditions, this usually leads to over-designing facilities.

U.S. Pat. No. 5,256,171, issued Oct. 26, 1993 Richard L. Payne and assigned to the assignee of the present invention, describes and claims one type of slug flow mitigation system for a production well fluid gathering system. It has been considered desirable to develop a slug flow mitigation system and method which does not require modification to existing facilities and which may take advantage of the capacity of a flowline itself to mitigate slug flow. Moreover, in developing remotely located and economically marginal oil and gas fields or for extending the development of an existing field, the costs associated with managing slug flow can result in such fields being declared unproductive. Accordingly, an inexpensive and easily retrofitted slug mitigation system and method is particularly attractive for keeping mature oil and gas production fields in production. It is to these ends that the present invention has been developed with a view to providing a system and method which utilizes existing facilities with only minor modifications to provide for controlling slug flow in gas and oil production flow facilities, in particular.

SUMMARY OF THE INVENTION

The present invention provides a system for mitigating slug flow which may be installed in existing oil and gas production facilities or may be easily incorporated in new facilities and which essentially utilizes one or more fluid production flowlines for mitigating slug flow.

In accordance with an important aspect of the present invention, a slug flow mitigation system is provided wherein a fluid production flowline has interposed therein a control valve and a device for sensing slug flow and for operating the control valve in accordance with a predetermined method to mitigate or reduce the volume of liquid, as a function of time, which enters the production treatment and separation facilities. The system and method may advantageously utilize existing gas-liquid separator devices which are present in essentially all hydrocarbon liquid gathering and treatment systems.

In accordance with another important aspect of the present invention, a method of mitigating liquid slug flow in hydrocarbon liquid and gas production flowlines is provided wherein a differential pressure or other slug flow detecting device is interposed in a flowline and operates to effect throttling of slug flow if the existence of a slug occurs for a predetermined period of time.

In accordance with another important aspect of the present invention, a slug flow mitigation method is provided wherein liquid level in a gas-liquid separator vessel is monitored together with or without sensing the presence of slug flow through the flowline leading to the separator vessel for throttling the slug flow to prevent excessive liquid flow into the separator and the fluid treatment facilities connected thereto.

Those skilled in the art will recognize the above-described features and advantages of the present invention together with other important aspects thereof upon reading the detailed description which follows in conjunction with the drawing.

DESCRIPTION OF PREFERRED EMBODIMENTS

Figure 1:
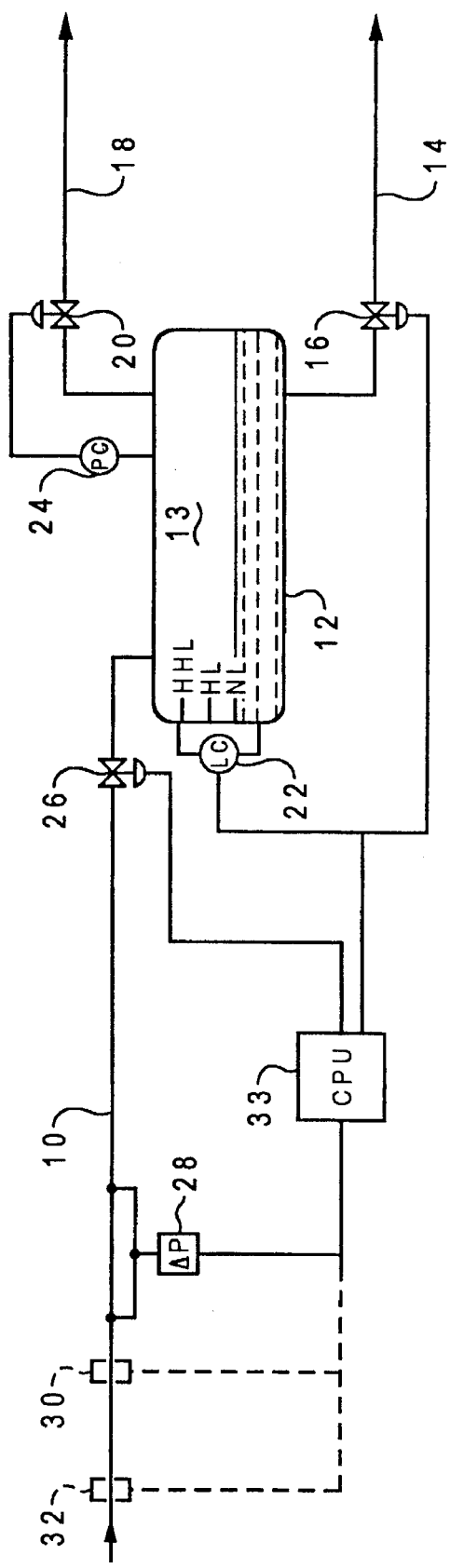
FIG. 1 is a schematic diagram illustrating the major components of a slug mitigation control system in accordance with the present invention.

In the description which follows, like parts are marked throughout the specification and drawing with the same reference numerals, respectively. The drawing figures are not necessarily to scale and certain elements are shown in generalized or somewhat schematic form in the interest of clarity and conciseness.

Referring to FIG. 1, there is illustrated, in schematic form, a system for mitigating liquid slug flow in a process flowline 10 which may comprise a so-called common line for gathering and transporting the production of several crude oil wells, or the flowline 10 may be connected to a single well. The flowline 10 is operably connected to a liquid-gas separator, generally designated by the numeral 12, and which may be of conventional construction. The separator 12, in its simplest form, may comprise a large pressure vessel which allows a liquid-gas mixture to enter the vessel interior space 13 and separate by gravity whereby liquid is taken off through a liquid discharge line 14 having a suitable motor operated control valve 16 interposed therein. Gas separated from liquid in the separator 12 is also taken off by way of a gas flowline 18 having a suitable motor operated control valve 20 interposed therein.

The level of liquid in the separator 12 may be controlled by a suitable level control device 22 which is operable to maintain a predetermined liquid level in the separator 12 by throttling the flow of liquid in the liquid discharge line 14 by way of the valve 16. A predetermined gas pressure in the separator 12 is also controlled by a suitable pressure control device 24 which effects operation of the valve 20 to regulate the gas pressure in the separator. The components described hereinabove are typical of an oil production facility wherein the fluids produced from one or more wells are conducted by way of a flowline 10 to a suitable gas-liquid separator and the separated gases and liquids are then conducted to further treatment facilities. Such equipment is provided with or without contemplation of slug flow and, if slug flow is contemplated during the operation of the facilities, additional structure is usually provided or at least the separator 12, for example, is "oversized" to handle the liquid slug flow. However, if the standard flowline and separation equipment of a production well flow handling system is not required to be replaced or enlarged when slug flow occurs, considerable savings in capital can be realized.

The present invention contemplates interposing a motor-operated control valve 26 in the flowline 10 upstream of the separator 12 with respect to the direction of flow of fluid to the separator. In one embodiment of the invention, suitable means are provided to detect slug flow in the flowline 10 including a differential pressure gauge 28, for example. Alternatively, one or more densitometers 30 and 32 may be interposed in the flowline 10 or other suitable means may be provided for detecting liquid flow versus gas flow in the flowline. Microwave or ultrasonic signal transmitting devices, for example, may be associated with the flowline 10 to detect the presence of liquid flow or gas flow. The densitometer 30, as well as the differential pressure gauge 28, may also be calibrated to determine, for a particular pressure condition in the flowline 10 and type of fluid being measured, the percent or "hold-up" of the "slug" flowing through the flowline which is actually liquid. Typical oil production wells may discharge so-called slugs of liquid through their production flowlines which may be almost fifty percent (50%) gas by volume. Accordingly, the slug mitigation and control system and method should consider the actual volume of liquid which would be present in a slug and which would be required to be dealt with by the separator 12. The methods of the present invention may be carried out utilizing the motor control valve 26, the level control device 22 and one of the slug detection devices such as the differential pressure gauge 28 or the densitometers 30 and/or 32. Signals from the slug detection devices may be compared with the level of liquid in the separator 12 by a suitable controller comprising a microprocessor or central processing unit (CPU) 33. The CPU 33 may be programmed to operate the flow control valve 26 in response to certain conditions sensed by the level control 22, the slug flow detection device 28 or 30, 32 and a predetermined method for effecting slug mitigation in accordance with the invention.

Figure 2:
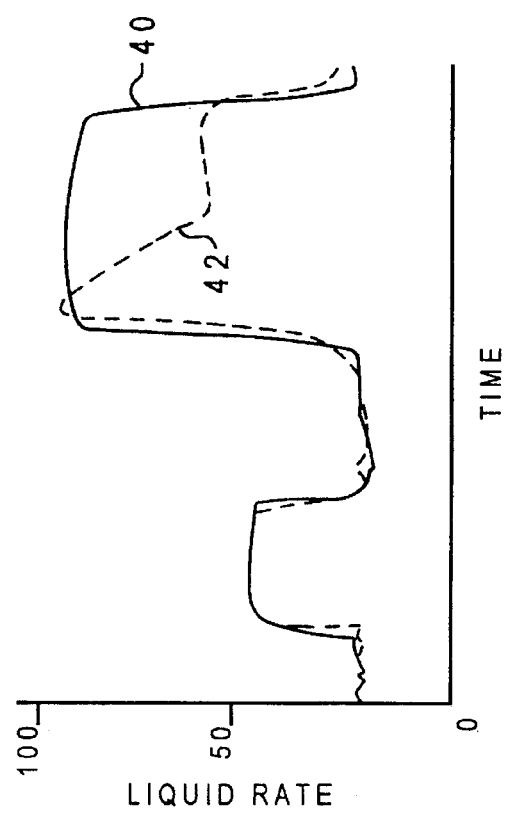
FIG. 2 is a diagram showing the effect of slug mitigation on liquid flow rate in a flowline using the system and methods of the present invention.

FIG. 2 illustrates a typical slug flow characteristic in terms of the liquid flow rate versus time. The liquid rate is given in arbitrary units of 50 and 100 for comparison purposes. If the liquid rate is less than fifty percent (50%) of a maximum contemplated, slug flow may be dealt with by a device such as the separator 12. On the other hand if slug flow produces a significantly higher liquid flow rate for a longer period of time, this volume of liquid must be controlled to prevent damage to the separation and treatment facilities and shutdown of the process which is handling the fluid production from the flowline 10. Line 40 in FIG. 2 indicates a typical slug flow characteristic for one or more oil production wells, for example. The dashed line 42 indicates the effect of controlling slug flow in accordance with the present invention. It will be noted that when the liquid rate is in excess of fifty percent (50%) of that contemplated, one or more of the methods of the invention will effect significant slug flow mitigation.

In accordance with one embodiment of the invention, slug flow is controlled by sensing the level of liquid in the separator 12 by way of the level controller 22 and effecting throttling of flow into the separator by way of the valve 26. In accordance with such method, it is considered of somewhat importance that the valve 26 be located directly upstream of the separator 12. The valve 26 is controlled to be in a one hundred percent (100%) open position as long as the level of liquid in the separator 12 is less than a predetermined level which will be designated as a high level alarm level or level HL as indicated in the drawing figure. If the liquid level rises to that between the level HL and a second and higher level designated by the level HHL, the valve 26 will be operated to throttle the flow of fluid from the flowline 10 in accordance with the following equation for the percent of full open position of the valve 26 ($V_{26}$ open).

$$V_{26} \text{open} = 100[1 - (L-HL)/(HHL-HL)] \quad (I)$$

where L equals the liquid level above the high level alarm level (HL) and HHL is the level at which the facility would be normally shut down or the valve 26 at zero percent open. In other words, if the level L equals the high level alarm level HHL, valve 26 is closed, and if the level L is below the alarm level HL, the valve 26 is 100% open. The valve response is linear between the level HL and the level HHL, although a nonlinear response may be tolerated.

The present invention also contemplates a method of slug flow mitigation using a system included in the diagram of FIG. 1 which utilizes a differential pressure gauge 28 or similar slug detection device. For example, if the differential pressure measured by the gauge 28 exceeds a predetermined amount, it is indicated that a slug of liquid is flowing through the flowline 10 instead of primarily gas. If the differential pressure exceeds the predetermined set amount, $\Delta P_{set}$, for a first predetermined time, the valve 26 is then controlled to be set at a certain percent of full open, say 80%. If the differential pressure sensed by the gauge 28 exceeds $\Delta P_{set}$ for a second predetermined period of time, then the valve 26 is throttled to a further reduced open position and, lastly, if the pressure differential in the flowline 10 exceeds $\Delta P_{set}$ for a third predetermined period of time, the valve 26 is operated to reduce its flow area to a further reduced percent of full open. If, at any time during the process of throttling flow in the flowline 10 using the pressure differential measurement and the throttling valve 26 wherein the pressure differential falls below the $\Delta P_{set}$, then the time being measured is reset to zero and pressure differential is monitored for return to the value of $\Delta P_{set}$. Estimates of the slug velocity and liquid "hold-up" or percentage of liquid volume in the slug may also be determined using a densitometer such as the densitometer 30.

It is contemplated that the pressure differential gauge 28 should be set up to measure pressure differential across a predetermined length of flowline 10 such as about ten feet to twenty feet. The $\Delta P_{set}$ or threshold pressure differential would be the minimum differential pressure that defines a liquid slug. A typical algorithm involving the measurement of differential pressure and time would be as follows. If the differential pressure exceeded $\Delta P_{set}$, it is indicated that a slug is progressing through the flowline 10 toward the separator 12 and a clock is started to record the time $\Delta T$. If the $\Delta P_{set}$ exists for, say, greater than five seconds, the valve 26 is set at 80% of full open. If the $\Delta P$ continues to exceed $\Delta P_{set}$ for an additional five seconds, the valve 26 is adjusted to be at fifty percent of full open position and, lastly, if the pressure differential sensed by the gauge 28 exceeds $\Delta P_{set}$ for fifteen seconds or more, the valve 26 is set at thirty percent of full open. With a system and method as described above for mitigating slug flow, relying on the pressure differential gauge or some other slug flow sensing device as a function of time, the separator 12 would also include the conventional level control 22 which would effect shutdown of the system and including closure of the valve 26 if the level of liquid in the separator exceeded the level HHL.

Yet another embodiment of a method for mitigating slug flow in the flowline 10 may be provided in accordance with the invention wherein a determination of available volume within the separator 12 is monitored for slug catching. The densitometers 30 and 32 may be used to measure slug velocity and slug hold-up (percent liquid in the slug) or the pressure differential gauge 28 may also be used to measure slug velocity, and the liquid hold-up or percent volume of liquid in the slug may be estimated. The available volume in the separator 12 would be calculated as follows:

$$V_a = V_{HHL} - V_L \qquad (II)$$

where $V_a$ is the available volume, $V_{HHL}$ is the liquid volume at the "high high" level or shutdown level and $V_L$ is the liquid volume at the level measured by the level sensor and control device 22. The slug front or leading end is determined when the pressure differential detected by the device 28 exceeds a threshold pressure or $\Delta P_{set}$ for a predetermined time interval, $T_l$. The so-called trailing or rear-end of the slug is then determined when the pressure differential signal stays below $\Delta P_{set}$ for another predetermined interval, $T_r$. Once a slug is identified, the liquid volume in the slug is calculated as follows:

$$V_s = (S_v)(T_d)(A_p)(H_l) \qquad (III)$$

where $V_s$ is the liquid volume in the slug, $S_v$ is the slug velocity, which may be either assumed or measured as described above, $T_d$ is the duration of the slug which is the sum of $T_l$ and the interval between $T_l$ and the onset of $T_r$, $A_p$ is the cross-sectional flow area of the flowline 10, which may be measured, and $H_l$ is the liquid hold-up or percent volume of the slug which is actually liquid and which may be assumed or measured.

Once the calculated liquid volume within the slug exceeds certain values in relation to the available volume in the separator 12, the valve 26 would be operated in accordance with a preset control algorithm. An example is as follows.

When $V_s$ is greater than 0.75 $V_a$, then valve 26 set at 75% open.

When $V_s$ is greater than 0.85 $V_a$, then valve 26 is set at 50% open, and When $V_s$ is greater than 0.95 $V_a$, then valve 26 is set at 30% open.

Once the trailing end of the slug is detected, all calculated values would be reset and the valve 26 would be opened at a slow and predetermined rate.

The methods of controlling slug flow in a fluid flowline without extensive system modifications to include slug catchers and similar devices described above are advantageous in that the flowline 10 is used to store and regulate the flow of liquid as opposed to providing a large downstream vessel. The method and devices required may be easily added to existing flow handling facilities and may be set to operate only on liquid slugs that would create a facility shutdown or severely impair the operation of a facility. The system and method are relatively inexpensive and the control algorithm may be programmed into a relatively inexpensive processor (CPU) operable to receive signals from devices such as the differential pressure gauge or device 28, the densitometers 30 and 32, and the level controller 22.

Although preferred embodiments of both a system and methods in accordance with the invention have been described in some detail herein, those skilled in the art will recognize that various substitutions and modifications may be made to the system and the methods without departing from the scope and spirit of the appended claims.

What is claimed is:

1. A system for mitigating liquid slug flow in a fluid flowline, said flowline being connected to a gas-liquid separator vessel, comprising:

a) a motor operated and normally open control valve interposed in said flowline upstream of said vessel with respect to the direction of flow of fluid through said flowline;

b) a densitometer for measuring the density of fluid flowing through said flowline to detect a liquid slug flowing through said flowline toward said control valve; and c) means for effecting operation of said control valve in response to one or more signals from a CPU programmed to operate said control valve in response to at least the conditions:

(1) one or more signals to said CPU from said means for detecting the presence of a liquid slug indicative of the presence of a slug in said flowline for a predetermined period of time; and (2) one or more signals to said CPU from said level controller and said means for detecting a liquid slug indicating that the liquid volume of a slug exceeds the available volume in said vessel to receive said slug;

to at least partially close said control valve during the duration of said condition.

2. The system set forth in claim 1 wherein:

said means for detecting said slug flowing through said flowline comprises a differential pressure gauge.

3. The system set forth in claim 1 including:

a level controller operably connected to said vessel for generating a signal related to the level of liquid in said vessel.

4. A method for mitigating the flow of liquid slugs through a fluid flowline connected to a gas-liquid separator vessel, said flowline having a normally open control valve interposed therein upstream of said separator vessel with respect to the direction of flow of fluid through said flowline and means for detecting the presence of a liquid slug flowing through said flowline toward said control valve, comprising the steps of:

determining the available volume in said vessel for receiving a liquid slug;

determining the presence of a liquid slug flowing toward said control valve through said flowline; determining the liquid volume of said slug;

comparing the volume of said slug to said available volume in said vessel and at least partially closing said control valve to reduce the flow therethrough when said volume of said slug exceeds said available volume in said vessel.

5. The method set forth in claim 4 wherein:

the step of detecting the presence of a slug in said flowline is carried out by measuring the pressure differential of fluid flowing through said flowline over a predetermined length of said flowline upstream of said throttling valve.

6. The method set forth in claim 4 wherein:

the volume of said slug is determined by measuring the duration of said slug flowing past a predetermined point in said flowline as determined by means for detecting the presence of said slug in the cross-sectional area of said flowline.

7. The method set forth in claim 5 wherein:

the liquid volume of said slug is determined by measuring the velocity of said slug in said flowline, the duration of said slug moving past a predetermined point in said flowline and the cross-sectional area of said flowline.

8. The method set forth in claim 7 including the step of:

measuring the percent liquid in said slug to determine the volume of liquid in said slug.

9. A system for mitigating liquid slug flow in a fluid flowline, said flowline being connected to a gas-liquid separator vessel, comprising:

a) a motor operated and normally open control valve interposed in said flowline upstream of said vessel with respect to the direction of flow of fluid through said flowline;

b) a densitometer for measuring the density of fluid flowing through said flowline to detect a liquid slug flowing through said flowline toward said control valve; and c) means for effecting operation of said control valve in response to one or more signals from a CPU programmed to operate said control valve in response to at least the conditions:

(1) one or more signals to said CPU from said means for detecting the presence of a liquid slug indicative of the presence of a slug in said flowline for a predetermined period of time;

(2) one or more signals to said CPU from a level controller in said gas-liquid separator vessel indicative of a level of liquid in said vessel above a predetermined level; and (3) one or more signals to said CPU from said level controller and said means for detecting a liquid slug indicating that the liquid volume of a slug exceeds the available volume in said vessel to receive said slug;

to at least partially close said control valve during the duration of said condition.

* * * * *